(12) United States Patent
Bruno et al.

(10) Patent No.: US 6,673,449 B2
(45) Date of Patent: Jan. 6, 2004

(54) NET MOLDED TANTALUM CARBIDE ROCKET NOZZLE THROAT AND METHOD OF MAKING

(75) Inventors: Salvatore Thomas Bruno, Newark, CA (US); Christopher Anthony Koch, Fremont, CA (US); Yazdan Paul Mantilla, Santa Clara, CA (US); Sanjay B. Prasad, Mountain View, CA (US); Jerome Paul Wittenauer, Palo Alto, CA (US); Deborah Lynn Yaney, Sunnyvale, CA (US); Joseph Zegarski, Montara, CA (US)

(73) Assignee: Lockheed Corporation, Bethesda, MD (US)

( * ) Notice: Subject to any disclaimer, the term of this patent is extended or adjusted under 35 U.S.C. 154(b) by 0 days.

(21) Appl. No.: 10/150,949

(22) Filed: May 21, 2002

(65) Prior Publication Data

US 2003/0126855 A1 Jul. 10, 2003

Related U.S. Application Data

(62) Division of application No. 09/612,985, filed on Jul. 10, 2000, now Pat. No. 6,510,694.

(51) Int. Cl.[7] .......................... B28B 21/42; B28B 21/72
(52) U.S. Cl. ....................... 428/389; 264/125; 264/269; 264/332; 264/112; 428/398
(58) Field of Search .................. 419/6, 8; 428/398, 428/389; 264/109–128, 269, 332

(56) References Cited

U.S. PATENT DOCUMENTS

| | | | |
|---|---|---|---|
| 3,142,960 A | | 8/1964 | Bluck |
| 3,264,135 A | | 8/1966 | Wakelyn et al. |
| 3,347,465 A | | 10/1967 | Shieber |
| 3,615,886 A | | 9/1971 | Caroll |
| 3,659,423 A | | 5/1972 | Lair et al. |
| 3,770,487 A | | 11/1973 | Gibson et al. |
| 4,668,583 A | | 5/1987 | Olander |
| 4,713,877 A | * | 12/1987 | Abbott et al. .................. 29/596 |
| 4,875,616 A | | 10/1989 | Nixdorf |
| 5,171,326 A | | 12/1992 | Ducheyne et al. |
| 5,223,045 A | | 6/1993 | Priceman |
| 5,318,217 A | | 6/1994 | Stinson et al. |
| 5,557,927 A | | 9/1996 | Chiang et al. |
| 5,759,300 A | | 6/1998 | Hasegawa et al. |
| 6,086,692 A | | 7/2000 | Hawkins et al. |
| 6,164,060 A | | 12/2000 | Myers et al. |
| 6,205,661 B1 | | 3/2001 | Ring |
| 6,209,312 B1 | | 4/2001 | Singer et al. |

FOREIGN PATENT DOCUMENTS

| | | |
|---|---|---|
| EP | 0381760 | 8/1990 |
| JP | 58106155 | 6/1983 |

* cited by examiner

Primary Examiner—Stephen J. Lechert, Jr.
(74) Attorney, Agent, or Firm—Townsend and Townsend and Crew LLP (57) ABSTRACT

A method of making heat engine components, such as rocket nozzle throats, includes forming a body having at least one surface, wherein the body is made of a refractory metal, and compressing a ceramic powder between a die and the at least one surface of the body, with sufficient heat and pressure to densify and thus form a solid ceramic coating on the at least one surface of the body. Nozzle throats made according to the invention have bodies made of refractory metals, such as tantalum, and ceramic coatings on the inner surfaces of the annular bodies, wherein the ceramic coatings are made of ceramic materials such as tantalum carbide.

14 Claims, 6 Drawing Sheets

NET MOLDED TANTALUM CARBIDE ROCKET NOZZLE THROAT AND METHOD OF MAKING

This application is a divisional of Ser. No. 09/612,985, filed Jul. 10, 2000, now U.S. Pat. No. 6,510,694.

BACKGROUND OF THE INVENTION

The present invention relates generally to metal/ceramic composite structures and methods of making same, and more specifically, to a tantalum-carbide ceramic nozzle throat made by diffusion bonding tantalum-carbide/tantalum$_2$-carbide to tantalum. In particular, a nozzle throat is made by forging a ceramic layer to a tantalum metal ring at high temperatures and pressures.

DESCRIPTION OF THE RELATED ART

Materials used for rocket nozzle throats, such as those used in tactical and strategic missiles, must survive severe thermal environments for anywhere from two seconds to over one minute. In previous long-range missiles, performance was the primary design driver. High performance goals led to the usage of expensive, exotic materials in the construction of the nozzle. One key component of the nozzle is the nozzle throat section, where the environment is most severe. Most long-range missiles in use today use carbon-carbon material. Carbon-carbon performs adequately but it is highly labor intensive, often taking up to two years to deliver one nozzle throat section, thus rendering the nozzle throat very expensive to produce. Less expensive materials have been fabricated into nozzle throats but failed to perform as well as carbon-carbon.

SUMMARY OF THE INVENTION

An object of the present invention is to provide a rocket nozzle throat that can be manufactured at substantial cost savings relative to carbon-carbon throats. This is achieved by the method of making rocket nozzle throats in which a ceramic material is net molded and bonded to a metallic liner, thereby reducing its manufacturing time compared to that of carbon-carbon.

Another object of the present invention is to provide a rocket nozzle throat that has better performance, in terms of erosion, than that of carbon-carbon, it being understood that lower erosion rates lead to improved missile range.

These and other objects of the invention are met by providing a rocket nozzle throat that includes a refractory metal ring and a ceramic layer net molded and diffusion bonded to the inner surface of the metal ring. Preferably, the ceramic is made of a mixture of tantalum carbide and tantalum$_2$ carbide (TaC/Ta$_2$C), here after referred to as tantalum carbide, and the metal ring is made from tantalum (Ta).

The refractory metal ring is further preferably made from a material selected from the group consisting of tantalum, tantalum alloys, molybdenum alloys, hafnium alloys, titanium alloys, tungsten alloys, and niobium alloys. Examples of suitable tantalum alloys include Ta-10W, Ta-2.5W, and Ta-40Nb. Another alloys that could be used is "C103," which is 89% Nb, 10% Hf, and 1% Ti.

These and other objects of the invention will become more apparent from the following detailed description when taken in conjunction with the illustrative embodiments in the accompanying drawings.

DETAILED DESCRIPTION OF THE PREFERRED EMBODIMENTS

Figure 1:
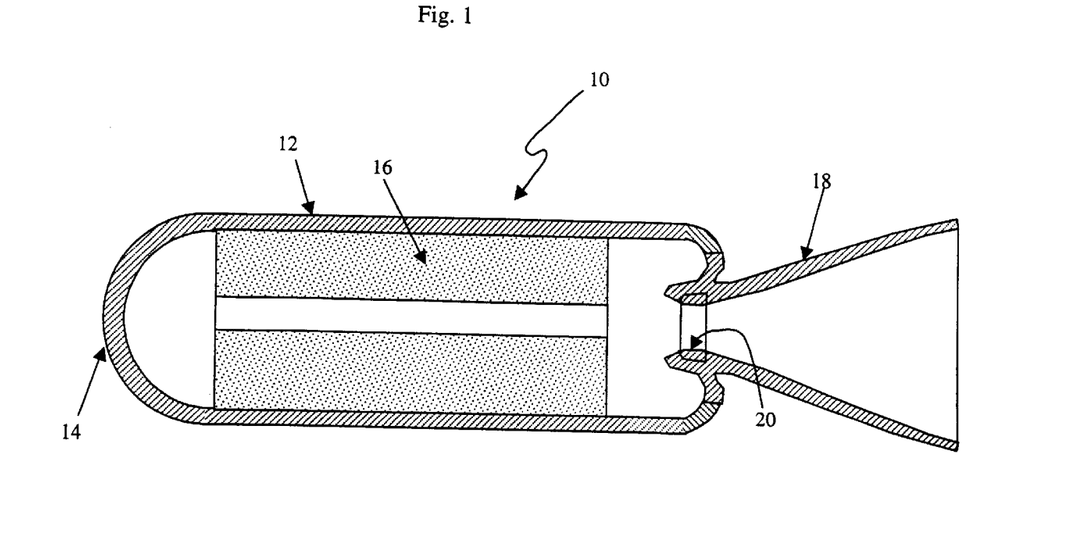
FIG. 1 is a horizontal cross-section of a rocket motor of the general type used in tactical missiles, shown for illustrative purposes but not to scale.

Referring to FIG. 1, a rocket motor 10 includes a body 12 which defines an interior chamber. The chamber contains a solid rocket propellant 16. A forward end 14 of the body 12 is closed, while a nozzle 18 is disposed at the opposite end. A throat insert 20 is disposed in a constricted zone of the nozzle 18. Combustion gases from the propellant pass through an opening of the nozzle throat 20 before expanding and exiting the nozzle 18.

Figure 2:
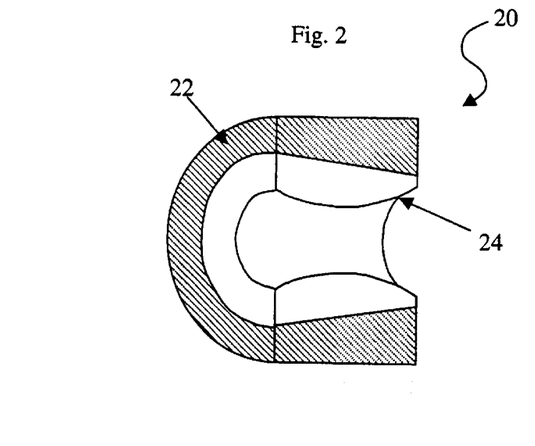
FIG. 2 is an enlarged view, partially cut-away, showing the rocket nozzle throat according to the present invention.

Referring to FIG. 2, the throat insert 20 includes a refractory metal ring 22 having a ceramic layer 24 diffusion bonded to the inner surface of the refractory metal ring. The refractory metal ring 22 is generally in the shape of an annulus having a central passageway. A throat region of the passageway is defined by circular, convex surface that defines a convergence/divergence region through which pass the expanding exhaust gases of the propellant.

Figure 3:
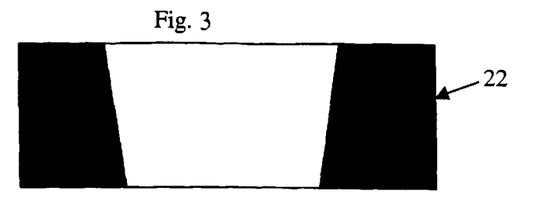
FIGS. 3 through 6 illustrate schematically, in sequence, the process of making rocket nozzle throats according to a preferred embodiment of the present invention.

The process of making a rocket nozzle throat, which may be in the form of an insert, is illustrated in FIGS. 3 through 6. The refractory metal ring 22 shown in FIG. 3 is first machined into desired shape, such as an annulus with its inner surface defined by a conical surface. A preferred material from which to make the ring 22 is tantalum, although similar refractory metals could be used. Other refractory metals that could be used include tantalum alloys, niobium alloys, hafnium alloys, molybdenum alloys, titanium alloys and tungsten alloys. Some examples of tantalum alloys (listed in weight percentages) include Ta-2.5W, Ta-10W, and Ta-40Nb. Another example of suitable alloys includes "103," which includes 89% niobium, 10% hafnium, and 1% titanium. Selection of the metal would be based on refractory-ness and high temperature compliance. Moreover, the material must be able to withstand the thermo-mechanical loading conditions imposed upon it by the ceramic material. The composite system must demonstrate the ability to diffusion bond.

Other ceramic materials can include ZrC, HfC, and NbC. Selection of the ceramic material would be based on refractory-ness (melting point) and fracture toughness. Other properties such as density, hardness, thermal properties, etc., would be relevant for design purposes; however, they would not be limiting factors.

Figure 4:
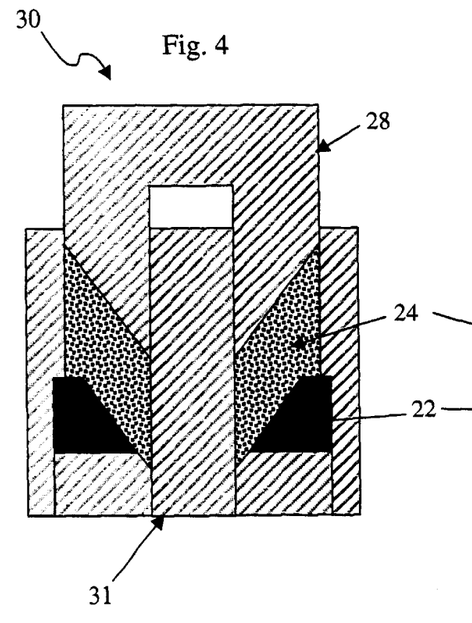
Figure 5:
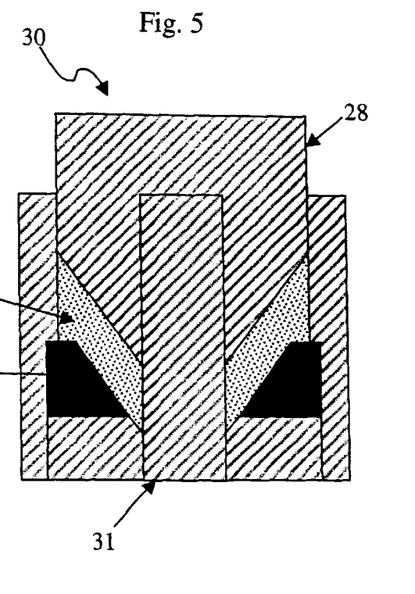

The metal ring is then placed inside of a forging tool 30, FIG. 4, having a central mandrel 31. The ceramic powders are placed in the forging tool, and a forging die 28 is placed over the powders. FIG. 4 shows the pre-pressed state of the operation. As seen in FIG. 5, at high temperatures, the forging tool 28 is pressed to consolidate the powders and to create a bond between the refractory metal 22 and the ceramic material.

The forging process takes place at extreme temperatures and pressures, e.g., temperatures at or above 3,000° F., and preferably between 3,000 and 5,000° F., and pressures at or above 10,000 psi, and preferably between ½ to 15 ksi.

In general, powder consolidation is expected to occur in the preferred range of 3,000 and 5,000° F., which are typically temperatures greater than ½ the melting point of the ceramic, yet less than the melting point of the metal. The applied pressure depends to some degree on the sample geometry; for example, a lower aspect ratio requires lower pressure. These temperatures and pressures are required to obtain a dense ceramic compact which demonstrates a cohesive interface with the refractory metal.

Figure 6:
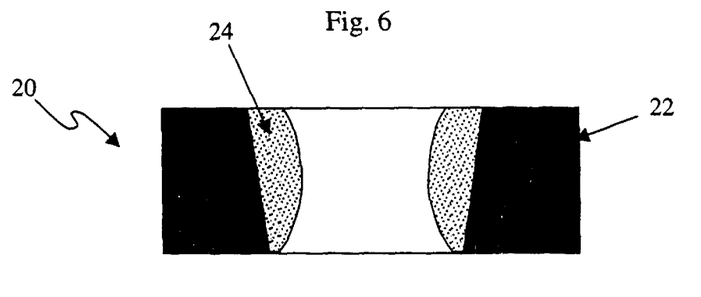

The powders are packed in the inner portion of the metal ring 22, and are subjected to the aforestated temperatures and pressures to thereby net-mold and bond the ceramic material to the metal ring. After initial application of pressure, the ceramic is allowed to cool down under pressure. During this step, the ceramic throat achieves a packing density of 95% maximum theoretical density. The molding step and densification of the ceramic material is shown in FIG. 5, whereby the ceramic material conforms to the shape of the inner surface of the refractory metal ring 22. As a final step, the throat insert undergoes a minimal amount of machining to make the insert match design specifications, thus completing the throat insert fabrication process. FIG. 6 shows one example of the finished product.

Figure 7:
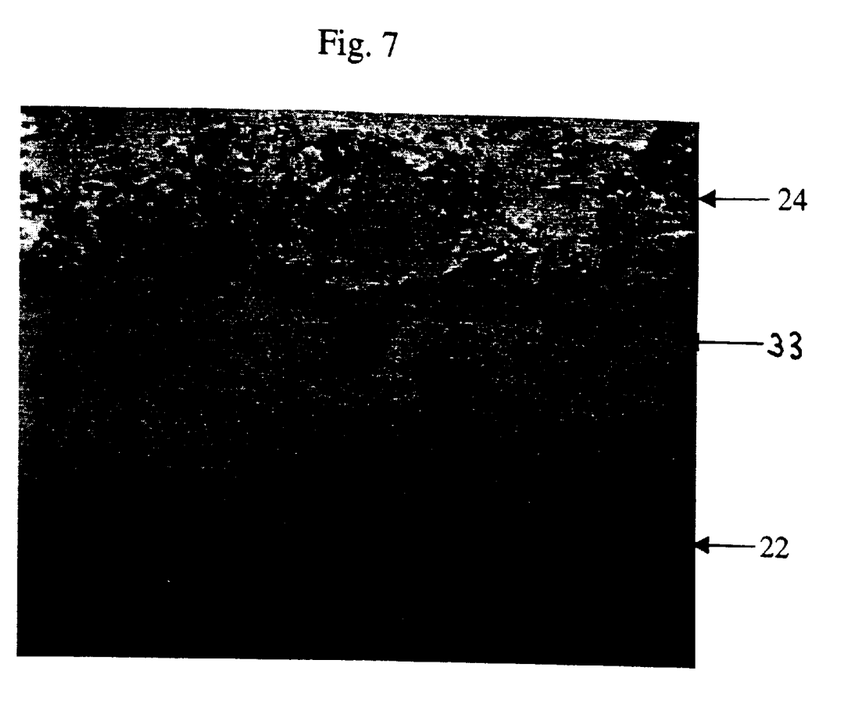
FIG. 7 is a photograph showing the diffusion-bonded microstructure of a rocket nozzle throat.

The diffusion bond formed between the ceramic material and the metallic material, produced at these extreme temperatures and pressures, reduces stresses due to thermal shock during motor firing. A microscopic photo of the diffusion bond is shown in FIG. 7. The darker portion of the photo is the ceramic layer 24. The lighter and more defined structure is the refractory metal ring 22. In between is the region of diffusion bond 33 where a transition from ceramic to metal can be observed.

The single step molding of the ceramic to metal ring dramatically lowers processing time of a nozzle throat compared to that of labor-intensive carbon-carbon.

Figure 8:
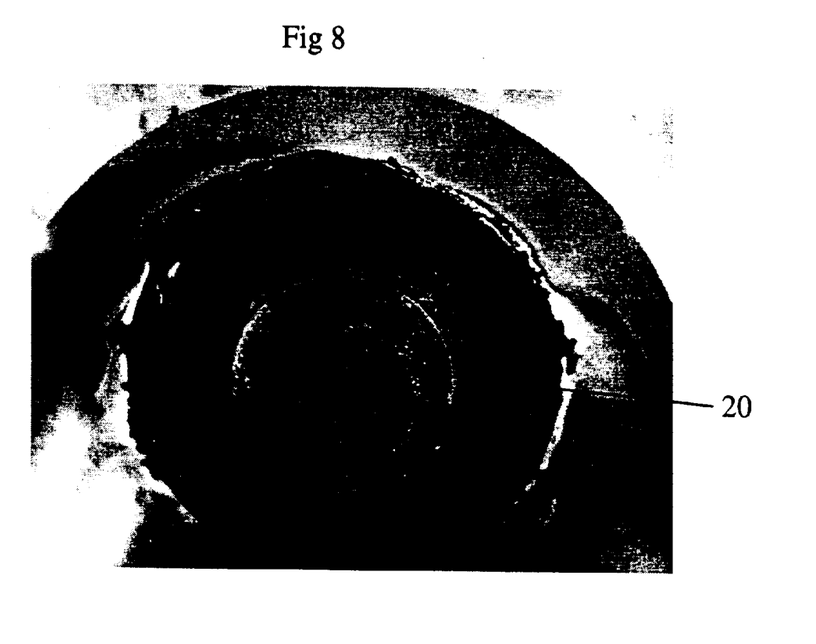
FIG. 8 is a photograph showing the ceramic throat after rocket test.
Figure 9:
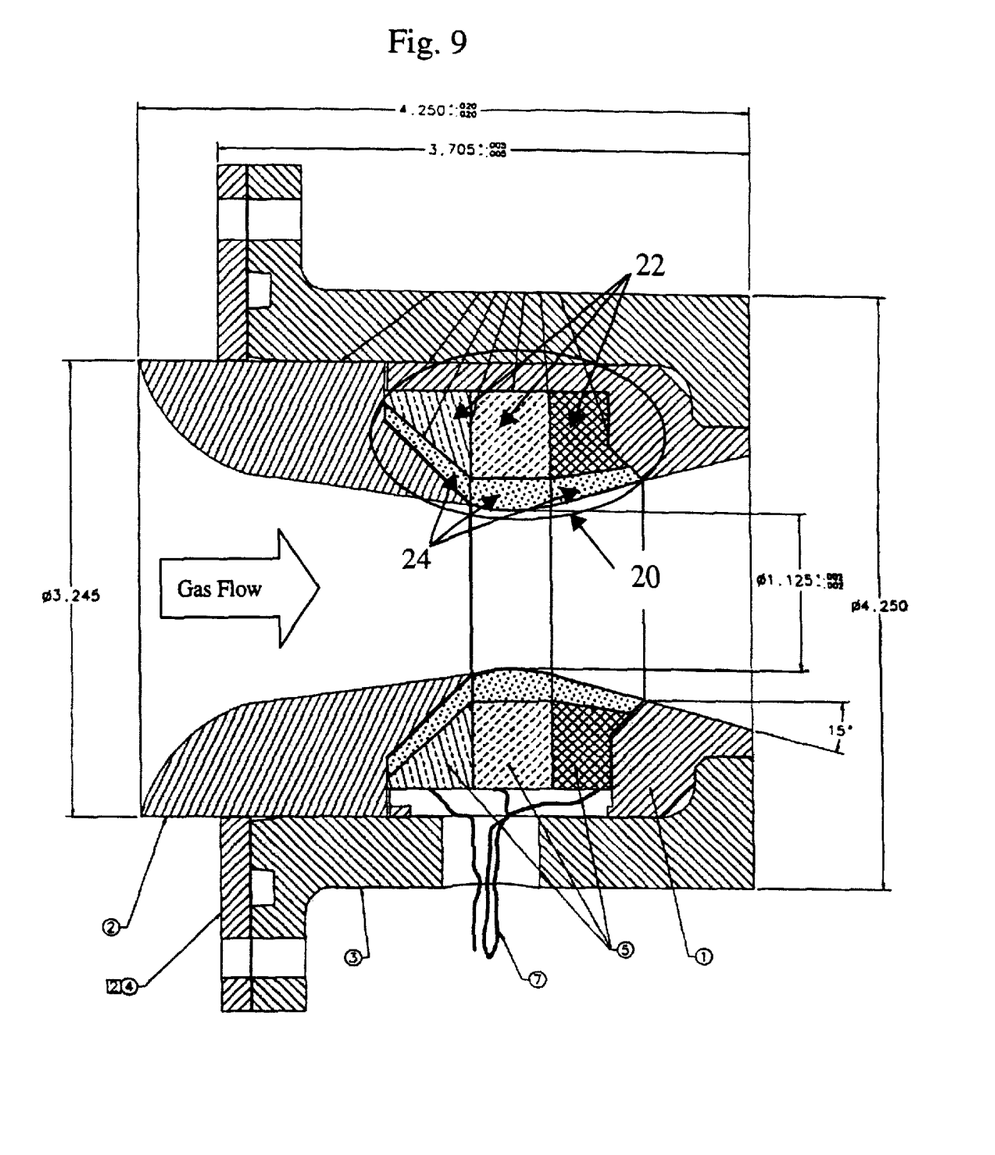
FIG. 9 is a detail drawing of the nozzle shown in 8, illustrating the three inserts that compose the throat section 20.
Figure 10:
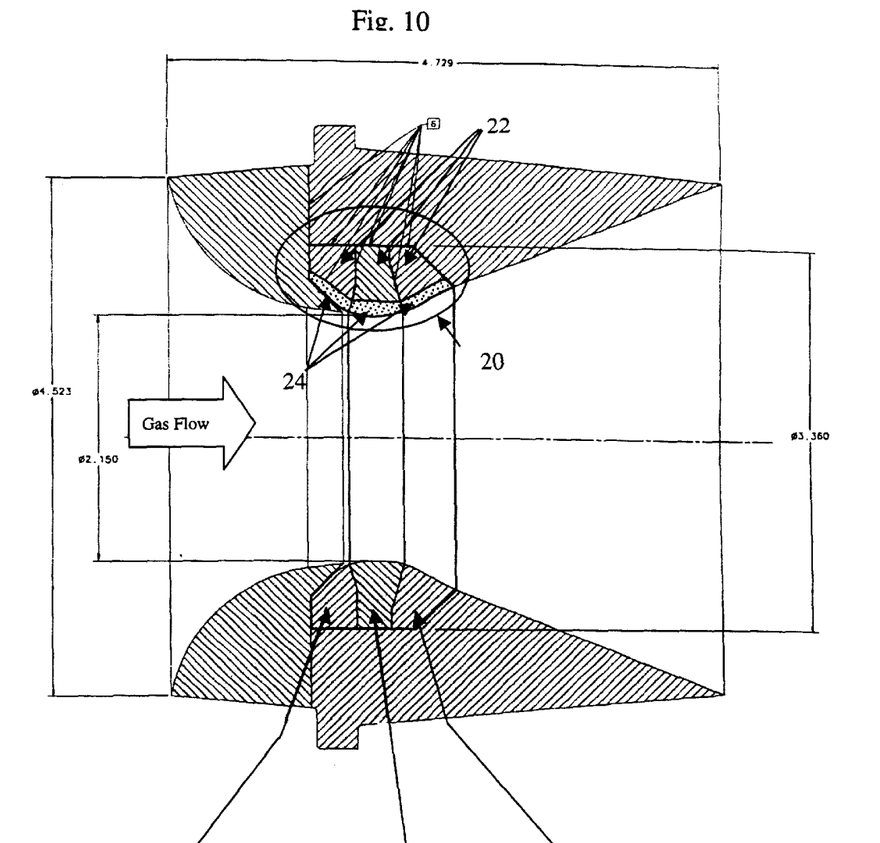
FIG. 10 is a cross-sectional view of a larger scale nozzle throat.
Figure 11:
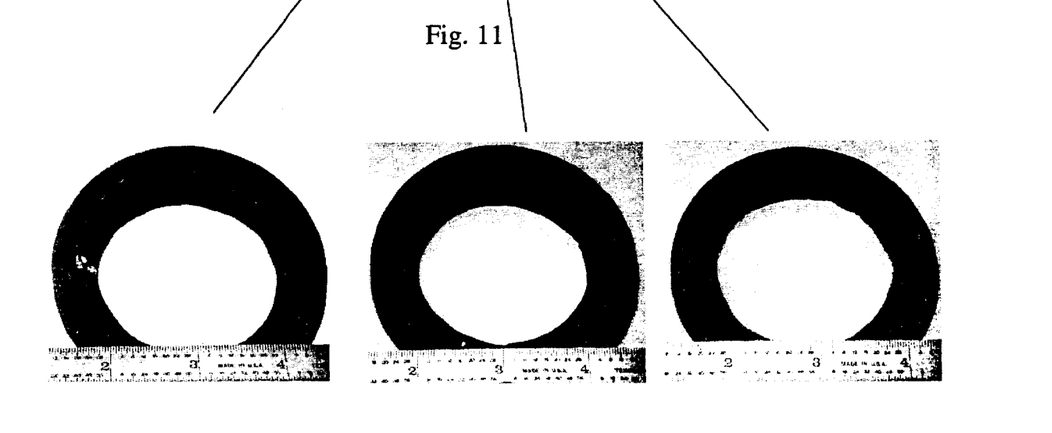
FIG. 11 are post-test photographs of the inserts shown in FIG. 10.
Figure 12:
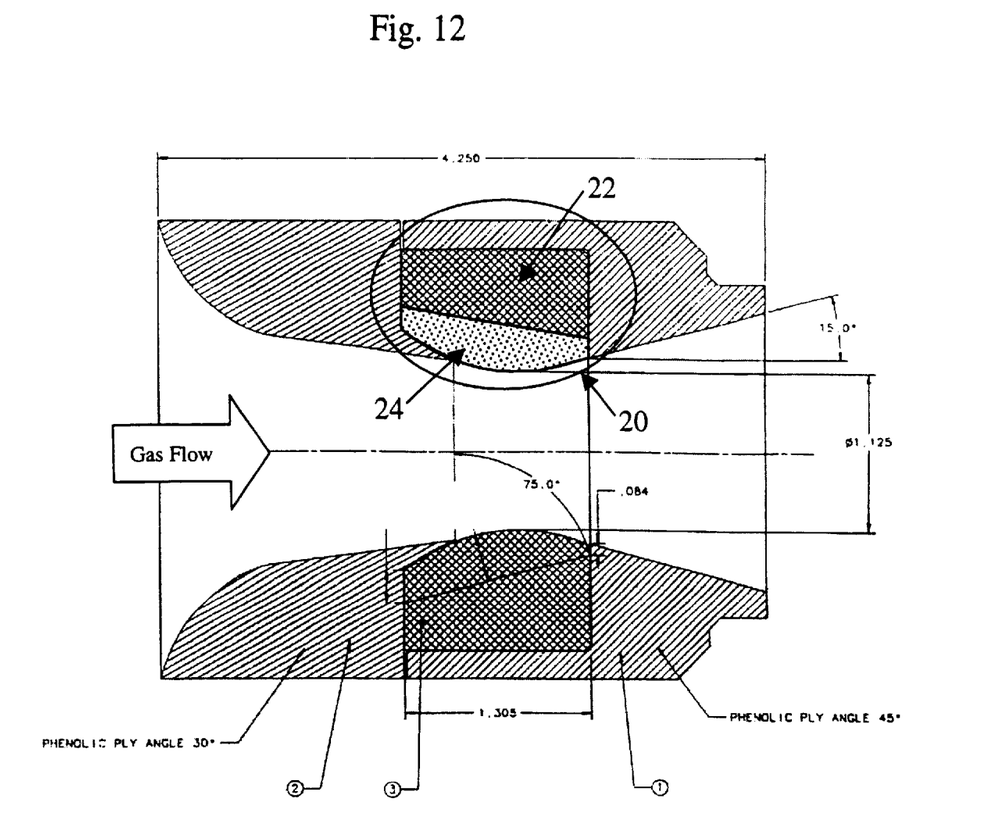
FIG. 12 is a cross-sectional view of a single piece nozzle throat design.

The process described for making rocket nozzle throats, by bonding tantalum-carbide to a tantalum ring, provides a nozzle throat that better withstands thermal shock and erosion than previous ceramic nozzle throats. Static-fire test results have demonstrated better erosion characteristics than that of carbon-carbon; this has the potential to lead to better missile performance during flight. FIG. 8 is a photograph of one such experiment. Throat insert 20 is visible from the aft end of the experimental nozzle. The thickness of the ceramic layer is chosen by considering burn time and required ablation depth of ceramic, nozzle throat contour requirements, and ablation rates of surrounding materials.

In one example of a throat insert, the refractory metal ring has a width of 1.5 inches, an inner diameter of 5.0 inches and an outer diameter of 6.0 inches. The metal ring can be machined from a 0.5-inch thick flat plate. The ceramic powders are mixed and packed on top of the inner annulus surface. The forging rams press the powders under high temperature and pressure, molding the ceramic into a tapered shape. The thickness of ceramic can be as much as 0.5". The final machining step finishes the throat insert into the desired shape design specifications for final assembly.

While the description shows a particular shape of the ceramic throat, virtually any type and shape of throat is within the scope of the present invention. Moreover, while the invention has been described with respect to rocket nozzle throats, other types of products can be made using the manufacturing techniques.

Although the invention has been described with reference to a particular embodiment, it will be understood to those skilled in the art that the invention is capable of a variety of alternative embodiments within the sprit of the appended claims.

What is claimed is:

1. A method of making a rocket nozzle throat, comprising:
    forming a body from refractory metallic material, the body having a generally annular shape and a central passageway defined by an inner surface;
    placing the body inside mold having a mandrel that extends through the central passageway;
    placing ceramic powders inside the central passageway; and
    applying pressure and temperature to the ceramic powders at sufficient levels to densify the ceramic powders and form a solid coating made of ceramic material on the surface of the central passageway, whereby the ceramic coating is diffusion bonded to the inner surface of the metal body.

2. A method according to claim 1, further comprising machining the ceramic coating to form a final nozzle throat surface.

3. A method according to claim 1, wherein the ceramic body is made of tantalum carbide and $tantalum_2$ carbide, and the metal body is made of tantalum.

4. A method according to claim 1, wherein the step of applying pressure and temperature to the ceramic powders comprises heating the body to a temperature of between about 3,000° F. and about 5,000° F., and applying pressure of between about ½ and 15 ksi to the ceramic body using upper and lower forging dies.

5. A method according to claim 1, further comprising selecting a thickness of the ceramic coating which is optimized for a given rate of ablation.

6. A method according to claim 1, wherein the diffusion bond of the ceramic coating to metal body militates against thermal shock.

7. A method according to claim 1, wherein the refractory metal body is made from a material selected from the group consisting of tantalum, tantalum alloys, hafnium alloys, molybdenum alloys, titanium alloys, tungsten alloys, and niobium alloys.

8. A method according to claim 1, wherein the step of placing ceramic powders inside the central passageway includes placing powders selected from the group consisting of TaC, $Ta_2C$, ZrC, HfC, and NbC.

9. A method of making heat engine components, comprising:
    forming a body having at least one surface, wherein the body is made of a refractory metal; and
    compressing a ceramic powder between a die and the at least one surface of the body, with sufficient heat and pressure to densify and [thus] form a solid ceramic coating on the at least one surface of the body.

10. A method according to claim 9, wherein the forming step comprises forming the body to have an annular shape with a central passageway defined by an interior surface, and the method further comprising, prior to the compressing step, placing the body in a mold having a mandrel extending at least partially through the central passageway, placing the ceramic powder between the mandrel and the interior surface of the body, and pressing the powder with a die for a time, and at a temperature and pressure sufficient to densify the ceramic powder and form the ceramic coating with the ceramic coating diffusion bonded to the body.

11. A product made by the method of claim 9.

12. A method according to claim 9, wherein the step of forming the body includes a body from a refractor metal material selected from the group consisting of tantalum, tantalum alloys, hafnium alloys, molybdenum alloys, titanium alloys, tungsten alloys, and niobium alloys.

13. A method according to claim 9, wherein the step of forming a refractory metal body includes forming the body from a material made from a material selected from the group consisting of Ta-2.5W, Ta-10W, Ta-40Nb, and an alloy consisting of 89% Nb, 10% Hf and 1% Ti.

14. A method according to claim 9, wherein the step of compressing a ceramic powder includes compressing a ceramic powder selected from the group consisting of TaC, $Ta_2C$, ZrC, HfC, and NbC.

\* \* \* \* \*

UNITED STATES PATENT AND TRADEMARK OFFICE
CERTIFICATE OF CORRECTION

PATENT NO. : 6,673,449 B2
DATED : January 6, 2004
INVENTOR(S) : Salvatore T. Bruno et al.

It is certified that error appears in the above-identified patent and that said Letters Patent is hereby corrected as shown below:

Title page,
Item [73], Assignee, "Lockheed Corporation, Bethesda, MD (US)" should read
-- Lockheed Martin Corporation, Bethesda, MD (US) --.

Column 4,
Line 61, "[thus]" should be deleted.

Signed and Sealed this

Tenth Day of August, 2004

JON W. DUDAS
*Acting Director of the United States Patent and Trademark Office*